Patented Apr. 28, 1931

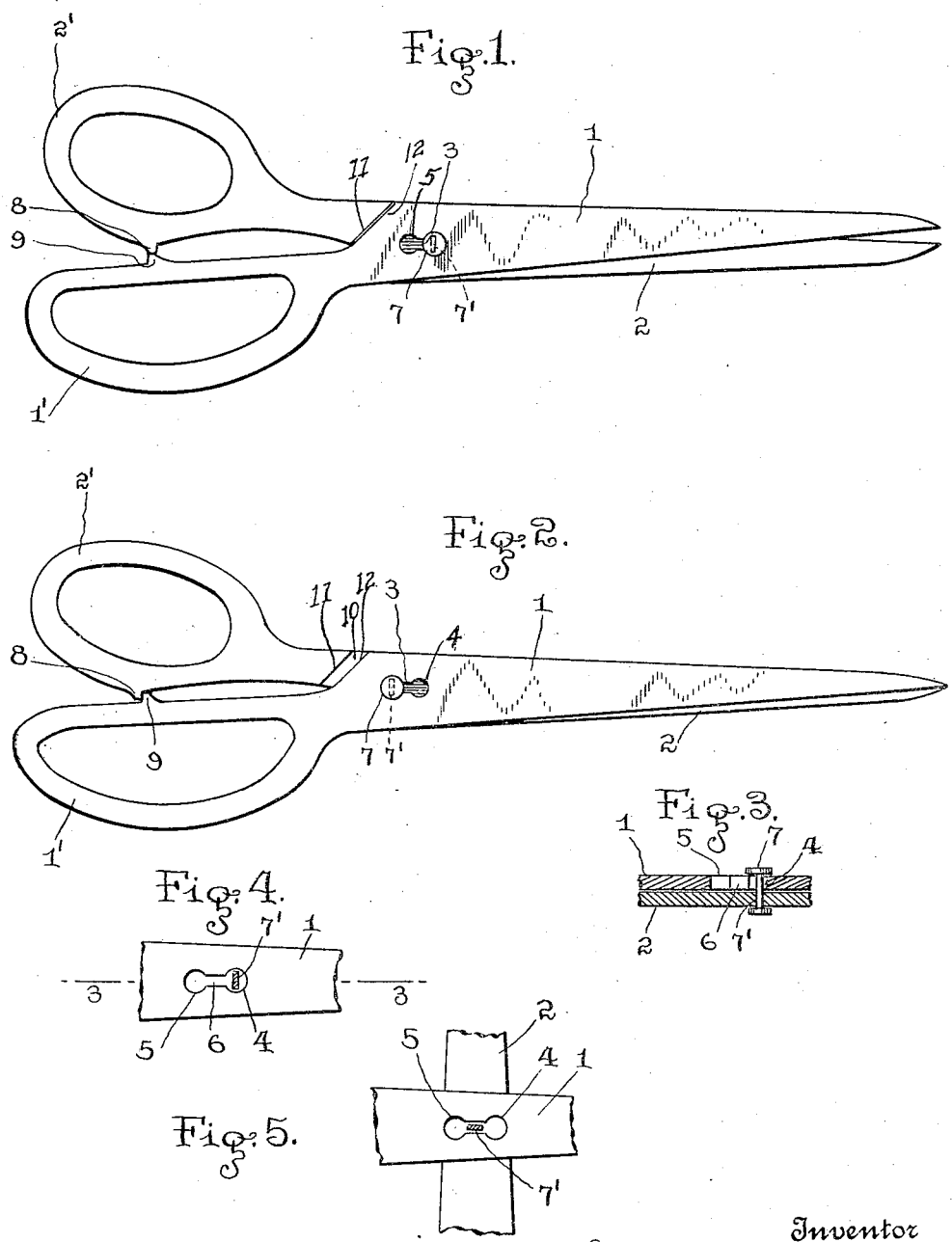

1,802,906

UNITED STATES PATENT OFFICE

CYRUS A. BRYANT, OF PASSAIC, NEW JERSEY

CUTTING IMPLEMENT

Application filed July 31, 1929. Serial No. 382,344.

My invention relates to improvements in shears cutting implements, such as scissors and the like and has for its object to provide means whereby the cutting blades may be limited in their movement toward each other so that they will be prevented from complete closing at the option of the operator or may be used in the normal manner as desired.

A preferred form of cutting implement embodying my invention is illustrated in the accompanying drawings, in which Figure 1 is a view of a pair of shears with my improved stop means in operative position, Figure 2 is a view of the same with the stop means in neutral position, Figure 3 is a section of the device on the line 3—3 in Figure 4, Figure 4 is a detail of the slot and pivot, and Figure 5 is a detail of the slot and pivot with the blades, in right angle position showing how the pivot may be passed through the slot.

Similar characters of reference refer to similar parts throughout the several views.

It is to be understood that any desired type of blade and handle members may be used and that the form illustrated in the accompanying drawings is for illustration only and not for the purpose of limiting the invention.

In the use of shears, scissors and the like, the complete closing of the cutting members causes the cutting blades to loose their grip on the material being cut, the jaws must then be reopened and again set on the material to be cut, and this frequently produces an irregular cut line and requires care and skill on the part of the operator to attain good and workmanlike results.

By the use of my invention, the labor of the operator may be reduced and better results attained as the complete closing of the cutting blades is prevented thus retaining the grip of the blades on the material being cut.

The integral jaw and handle members 1 and 2 may be of any desired type.

One said member 1 is provided with a cut out seat 3 for a pivotal connection between the members 1 and 2, which seat comprises two enlarged circular end portions 4 and 5 and a narrow connecting slot 6 therebetween.

The other said member 2 is provided with a headed pivot 7, seated in the cut out seat 3 and having a flattened shank $7^1$ of a width in one direction only, sufficiently narrow to permit it to pass edgewise through the slot 6 from one enlarged end portion to the other said enlarged end portion of the seat 3, the width of the shank $7^1$ of the pivot 7, in the other direction, being such that the pivot 7 will lock within one said end portion of the seat 3 unless rotated to a position where its narrow side is presented at the slot 6.

The cut out seat 3 is positioned longitudinally in the member 1 and the pivot 7 is positioned in the member 2 with the long sides of the shank $7^1$ toward the ends of the member 1, in such manner that the pivot 7 is normally set across the narrow portion 6 of the seat 3 so that the shank $7^1$ may be passed through the slot 6 only when the members 1 and 2 are positioned at right angles to each other and shown in Figure 5. The member 2, is provided with a cut out portion 10 to receive the member 1, as is usual in scissors and the like, and has a shoulder 11 against which the shoulder 12 of the member 1 rests when the pivot 7 is seated in the aperture 4, preventing the complete closing of the jaws or cutting members, as illustrated in Figure 1. When the pivot 7 is seated in the aperture 5, as illustrated in Figure 2, the shoulders 11 and 12 are moved apart and the members 1 and 2 may be completely closed. There may also be provided on the handles $1^1$ and $2^1$ respectively, off-set lugs 8 and 9 so positioned thereon that when the pivot 7 is set in the enlarged end portion 5 of the seat 3, the lugs 8 and 9 will not contact with each other and the implement may be used in the normal manner. When, however, the pivot 7 is set in the enlarged end portion 4 of the seat 3, the members 1 and 2 will be shifted and the off-set lugs 8 and 9 will contact with each other as the handles are closed and will thus prevent the complete closing of the blades.

The parts being thus assembled, and it being desired to use the implement in the usual manner, the pivot 7 is positioned in the enlarged end portion 5 of the seat 3, as illustrated in Figure 2. The off-set lugs 8 and 9, on the handles $1^1$ and $2^1$ will thus lie out of the same plane and the implement may be used in the normal manner without interference by the stop means.

When it is desired to bring the stop means into operative position, the members 1 and 2 are spread apart at right angles to each other as shown in Figure 5, thus bringing the narrow width of the shank $7^1$ of the pivot 7 to position where the shank $7^1$ may be passed through the narrow portion 6 of the seat 3, the members 1 and 2 are caused to slide upon each other and the pivot 7 is thus moved from the enlarged end portion 5, through the narrow slot 6 to the enlarged end portion 4 of the seat 3 and the blades are shut. The blades will then be in the position shown in Figure 1 with the off-set lugs 8 and 9 in the same plane whereby the lugs 8 and 9 will contact as the blades and handles are brought together and will prevent the complete closing of the blades or cutting members.

The pivot may thus be moved from one enlarged end portion of the seat 3, to the other through the slot 6, as desired, and the stop means brought into operative or neutral relation at the will of the operator.

Having thus described my invention, what I claim is:

1. In a device of the character described, the combination of a pair of integral blade and handle members, stop means associated therewith, said stop means comprising a plurality of off-set lugs positioned on the said members, a seat in one said member having large round end portions and a narrow connecting slot positioned longitudinally of the said member, a pivot on the other said member seated in said seat and having a flattened shank permitting the pivot to be passed through the slot only when the said members are spread whereby the said lugs may be positioned in operative and neutral positions.

2. In a device of the character described, the combination of a pair of integral blade and handle members, projections thereon, a cut-out aperture in one of the said members comprising a slot positioned longitudinally of the said member and having enlarged end portions, a pivot in the other of the said members and seated in the said cut-out aperture and having a flat shank whereby it may be moved from one enlarged end portion to the other end portion when the said members are spread, whereby the projections on said members may be caused to contact to prevent the complete closing of the blades when the pivot is in one of the said end portions only.

In testimony whereof I affix my signature.

CYRUS A. BRYANT.